US009644990B2

(12) United States Patent
Ishihara et al.

(10) Patent No.: US 9,644,990 B2
(45) Date of Patent: May 9, 2017

(54) SYSTEMS AND METHODS FOR ADJUSTING SINK RATE ALERT ENVELOPE FOR SPECIAL LANDING ZONES

(75) Inventors: Yasuo Ishihara, Kirkland, WA (US); Steve Johnson, North Bend, WA (US); Gary A. Ostrom, Bellevue, WA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 490 days.

(21) Appl. No.: 13/286,141

(22) Filed: Oct. 31, 2011

(65) Prior Publication Data
US 2013/0106623 A1 May 2, 2013

(51) Int. Cl.
| | |
|---|---|
| *G08B 23/00* | (2006.01) |
| *G01C 23/00* | (2006.01) |
| *B64D 45/04* | (2006.01) |
| *G01C 21/00* | (2006.01) |
| *G05D 1/06* | (2006.01) |
| *G08G 5/00* | (2006.01) |
| *G08G 5/02* | (2006.01) |

(52) U.S. Cl.
CPC ............ *G01C 23/00* (2013.01); *B64D 45/04* (2013.01); *G01C 21/00* (2013.01); *G05D 1/0676* (2013.01); *G08G 5/0021* (2013.01); *G08G 5/0086* (2013.01); *G08G 5/025* (2013.01)

(58) Field of Classification Search
CPC .... G05D 1/0676; G05D 1/0684; B64D 45/04; G08G 5/0086; G01C 5/005; G01C 21/00; G01C 23/00
USPC ...... 701/4, 9, 14, 16, 29, 206, 301; 340/945, 340/946, 963, 967, 970, 971, 973
See application file for complete search history.

(56) References Cited

U.S. PATENT DOCUMENTS

| | | | |
|---|---|---|---|
| 4,454,510 A | * | 6/1984 | Crow .............................. 342/32 |
| 4,551,723 A | | 11/1985 | Paterson |

(Continued)

FOREIGN PATENT DOCUMENTS

| | | |
|---|---|---|
| CN | 100568140 C | 12/2009 |
| JP | H 06127485 A | 5/1994 |

OTHER PUBLICATIONS

CN Office Action for Application No. 201210529850.1 dated Sep. 1, 2015.

(Continued)

*Primary Examiner* — An T Nguyen
(74) *Attorney, Agent, or Firm* — Ingrassia Fisher & Lorenz, P.C.

(57) ABSTRACT

Systems and methods for improving sink rate alerting for rotary wing aircraft. In one example, the system includes a radio altimeter that produces an altitude value, a processor that is in signal communication with the user interface device and the radio altimeter. The processor receives an altitude value, a position value for the aircraft and landing zone (LZ) information. The processor determines if the aircraft is on an approach to land at an LZ that is raised above surrounding terrain based on the received position value and LZ information. The processor receives sink rate information for the aircraft and generates a sink rate alert based on the received sink rate information and the aircraft altitude value if the sink rate information is greater than a sink rate value adjusted according to the LZ information. An output device outputs the generated sink rate alert. The LZ information includes an altitude value.

11 Claims, 4 Drawing Sheets

(56) References Cited

U.S. PATENT DOCUMENTS

| | | | | |
|---|---|---|---|---|
| 4,567,483 | A * | 1/1986 | Bateman | G01C 5/005 340/967 |
| 5,260,702 | A * | 11/1993 | Thompson | 340/970 |
| 5,839,080 | A * | 11/1998 | Muller et al. | 701/9 |
| 6,583,733 | B2 * | 6/2003 | Ishihara | B64D 45/04 340/946 |
| 6,785,594 | B1 * | 8/2004 | Bateman et al. | 701/9 |
| 7,672,758 | B2 * | 3/2010 | Astruc | 701/16 |
| 8,098,176 | B2 * | 1/2012 | Ishihara et al. | 340/970 |
| 2010/0168939 | A1 * | 7/2010 | Doeppner et al. | 701/16 |
| 2011/0106344 | A1 | 5/2011 | Geoffroy et al. | |

OTHER PUBLICATIONS

Chinese Office Action for Application 201210529850.1 dated May 5, 2016.

EP Search Report for Application No. 12190292.8-1557/2587217 dated Jun. 27, 2016.

Office Action for Japanese Patent Application No. 2012-238945 dated Aug. 29, 2016.

* cited by examiner

SYSTEMS AND METHODS FOR ADJUSTING SINK RATE ALERT ENVELOPE FOR SPECIAL LANDING ZONES

BACKGROUND OF THE INVENTION

There have been several incidents in which a helicopter approaching a raised landing zone (LZ) has descended below the LZ altitude without receiving any warning of too great a sink rate. Because a helideck is raised (often a few hundred feet above the ground or ocean), the existing sink rate alert function doesn't provide a timely alert. In the current ground proximity warning system (GPWS) for helicopters, the sink rate alert envelope is determined using only radio altitude information. The aircraft's radio altitude continues to read a large value (300 feet, for example) until the helicopter gets over the helideck. At that point, the radio altitude jumps to 20 feet, for example. Often, the helicopter is sinking toward the helideck at that point, and there may not be sufficient time for the pilot to react if the sink rate is greater than optimal.

SUMMARY OF THE INVENTION

The present invention provides systems and methods for improving sink rate alerting for rotary wing aircraft. In one example, the system includes a radio altimeter that produces an altitude value, a processor that is in signal communication with the user interface device and the radio altimeter. The processor receives an altitude value, a position value for the aircraft and landing zone (LZ) information. The processor determines if the aircraft is on an approach to land at an LZ that is raised above surrounding terrain based on the received position value and LZ information. The processor receives sink rate information for the aircraft and generates a sink rate alert based on the received sink rate information and the aircraft altitude value if the sink rate information is greater than a sink rate value adjusted according to the LZ information. An output device outputs the generated sink rate alert. The LZ information includes an altitude value.

In one aspect of the invention, the aircraft is a rotary wing aircraft and the the LZ is a helipad.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
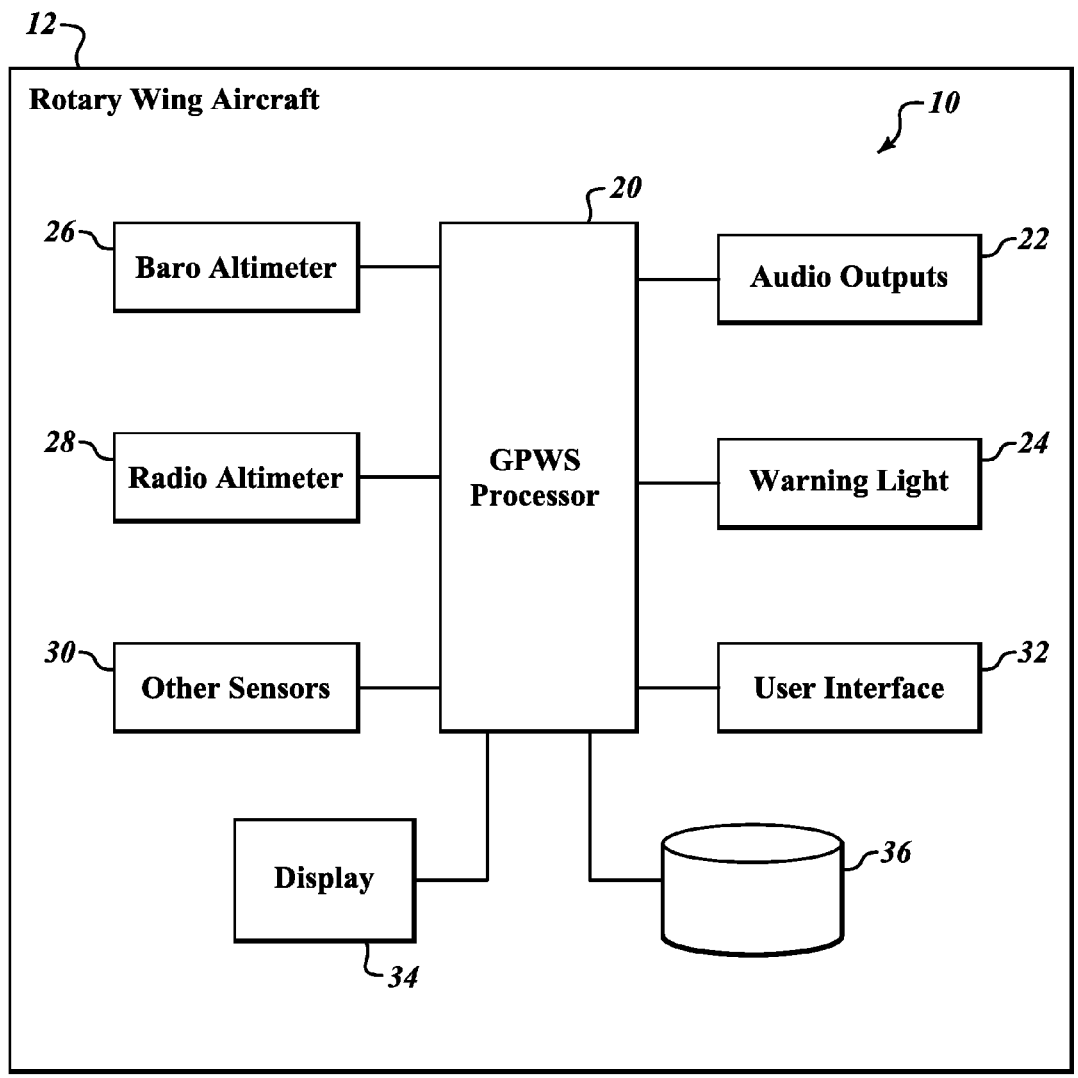
FIG. 1 is a block diagram of an exemplary system formed in accordance with an embodiment of the present invention.

As shown in FIG. 1, a rotary-wing aircraft 12 includes a warning system 10 for providing a "sink rate" warning using an improved threshold altitude. The system 10 includes a ground proximity warning system (GPWS) processor 20, an audio output 22, a warning light 24, a barometric altimeter 26, a radio altimeter 28, one or more various other sensors 30, a user interface 32, a display device 34, and memory 36.

The memory 36 stores information associated with a plurality of special landing zones (LZs) and terrain/obstacle information (e.g., altitude). The special LZs include helipads that are raised above surrounding terrain or obstacles. Example helipads are located on oil rigs, building tops, ships, hilltops, or similar locations.

When the aircraft 12 is determined to be approaching to land on one of the special LZs, the processor 20 determines if the sink rate of the aircraft 12 is above a threshold based on LZ altitude information stored in the memory 36, altitude information received from the radio altimeter 28, and sink rate that is based on information from the barometric altimeter 26 and/or the other sensors 30 (such as a global positioning system (GPS) or inertial navigation system (INS)).

Figure 2:
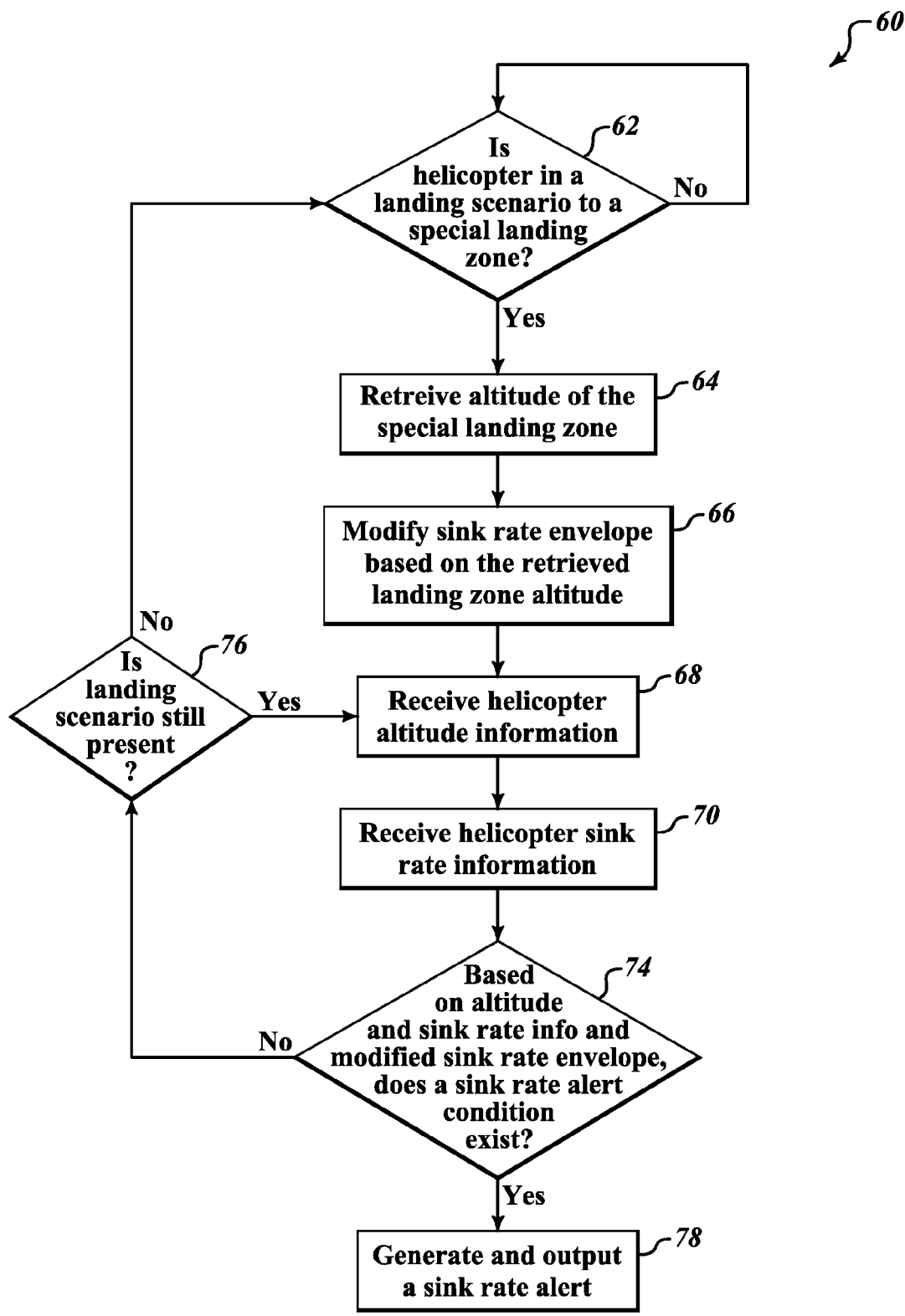
FIG. 2 is a flowchart of an exemplary process performed by the system shown in FIG. 1.

FIG. 2 shows an exemplary method 60 performed by the warning system 10 shown in FIG. 1. First at a decision block 62, the processor 20 determines if the rotary wing aircraft 12 is in a landing scenario to a special LZ. The processor 20 makes this determination based on various information, such as position information received from the other sensors 30, special LZ information stored in the memory 36, aircraft configuration information (e.g., sink rate, speed), flight plan/path information and/or information that might indicate beginning of flight termination. In another embodiment, the pilot manually indicates a landing approach to a special LZ.

Next at a block 64, if the processor 20 determines the aircraft is approaching to land at a special LZ, the processor 20 retrieves the altitude information for the identified special LZ from the memory 36. Then at a block 66, the processor 20 modifies a sink rate envelope based on the retrieved altitude information. At blocks 68, 70, altitude information and sink rate information for the aircraft 12 are received at the processor 20 from either the barometric altimeter 26 or the other sensors 30. Then at a decision block 74, the processor 20 determines if a sink rate condition exists based on the altitude information, the sink rate information and the modified sink rate envelope. If the sink rate condition is determined to not exist, then at a decision block 76, the processor 20 determines if the landing scenario to the current special LZ still exists. If the processor 20 determines that the aircraft 12 is still on approach to the special LZ, then the process 60 returns to block 68. If the processor 20 does not determine that the aircraft 12 is still on approach to the special LZ, then the process 60 returns to block 62. If at the decision block 74, the processor 20 determines that the sink rate condition is determined to exist, then at a block 78, a sink rate alert is generated and outputted to one or more of the output devices (e.g., the display 34, the audio output 22, the warning light).

Figure 3:
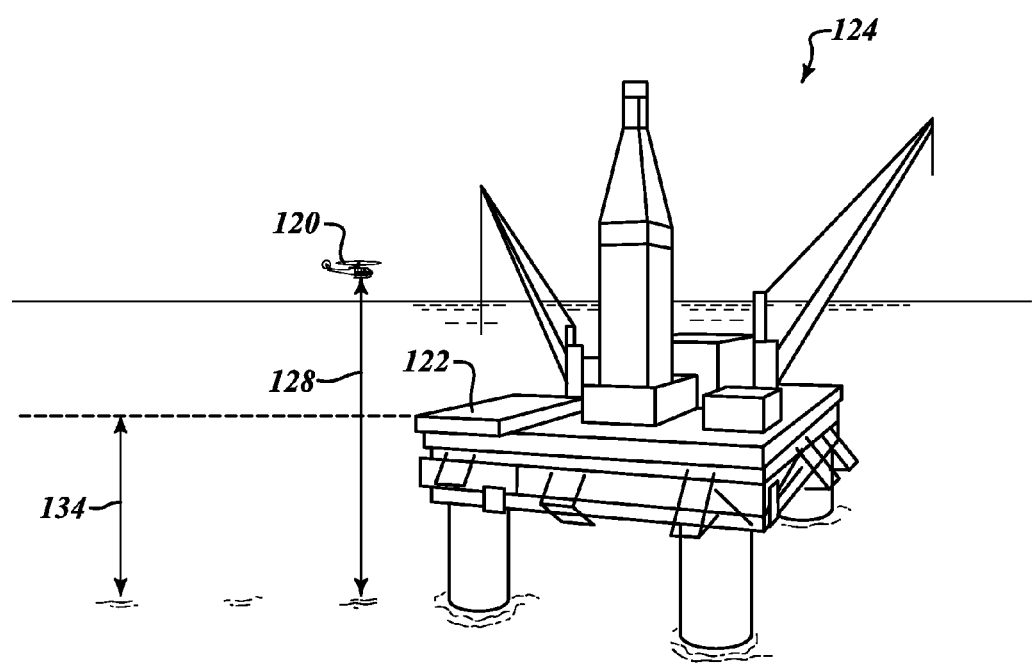
FIG. 3 is a perspective view of a helicopter on approach to landing at a helipad on an oil rig.

FIG. 3 illustrates an oil rig platform 124 that includes a helipad 122 (a special LZ) that is located some height above sea level. A helicopter 120 is approaching the helipad 122 (or other platform located on a raised structure) with an altitude over water 128 (or radio altitude). In a prior system, a sink rate alert will not be generated before the helicopter 120 is directly over the helipad 122, unless the helicopter 120 is below the helipad 122 to the point where the sink rate envelope becomes effective.

Figure 4:
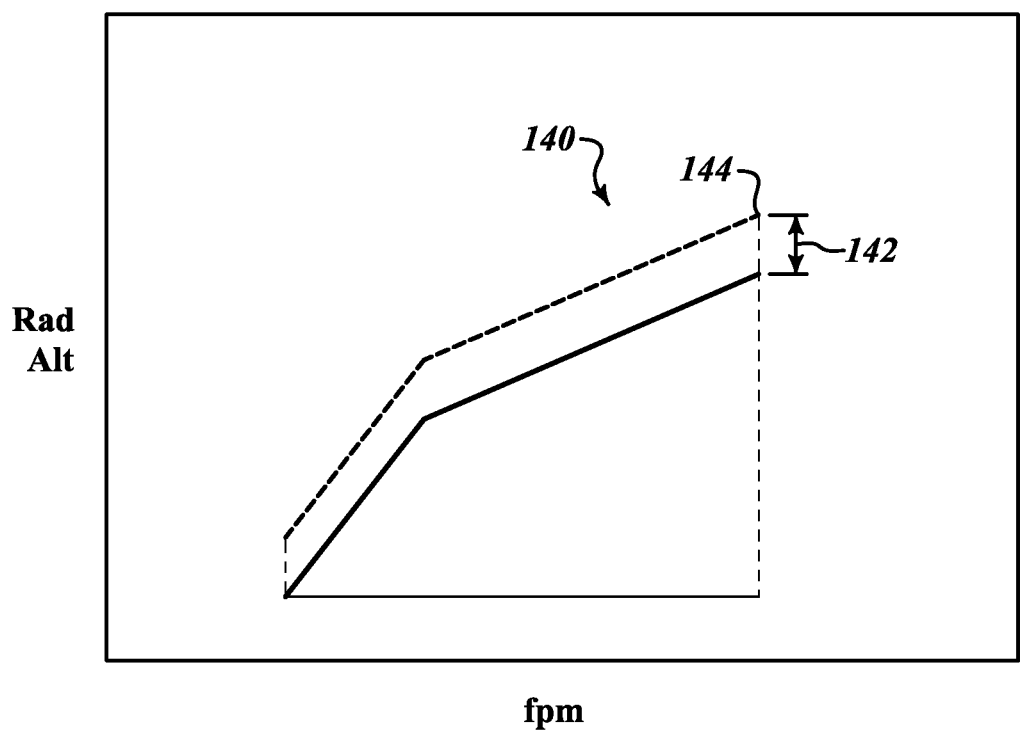
FIG. 4 illustrates a chart of a sink rate alert envelope modified in accordance with an embodiment of the present invention.

FIG. 4 illustrates an exemplary sink rate envelope 140 modified when an aircraft is approaching to land at a special LZ. In this example, the LZ the aircraft 12 is approaching is 300 feet/100 meters above the surrounding terrain. When the processor 20 receives the LZ height information, the processor 20 adjusts the upper boundary 144 of the sink rate envelope 140 by an amount 142 equal to or proportional to the received LZ height information. Thus, when the aircraft's sink rate in an approach to a normal LZ would not result in a sink rate alert condition at an altitude of 400 feet at a sink rate of 1200 feet per minute (fpm), it would in this case.

While the preferred embodiment of the invention has been illustrated and described, as noted above, many changes can be made without departing from the spirit and scope of the invention. For example, this invention may be used with vertical takeoff and landing (VTOL) or vertical short takeoff and landing (VSTOL). Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A sink rate alert system for an aircraft, the system comprising:
   a radio altimeter configured to produce an aircraft altitude value; and
   a ground proximity warning system in signal communication with the radio altimeter and configured to:
   receive the aircraft altitude value and an aircraft position value for the aircraft;
   receive landing zone (LZ) information for an approaching landing zone;
   determine an elevated landing scenario based on the received aircraft position value and LZ information, the elevated landing scenario indicating that the aircraft is on an approach to land at a landing zone which is raised above surrounding terrain;
   adjust an upper boundary of a sink rate alert envelope by an amount proportional to LZ height information to define a modified sink rate alert envelope for the elevated landing scenario;
   receive sink rate information including an aircraft sink rate for the aircraft;
   generate a sink rate alert during the elevated landing scenario when the aircraft sink rate is outside the modified sink rate alert envelope; and
   output the sink rate alert to an output device.

2. The system of claim 1, wherein the output device is an audio device.

3. The system of claim 1, wherein the output device is a video device.

4. The system of claim 1, wherein the LZ information comprises an altitude value.

5. The system of claim 1, wherein the aircraft is a rotary wing aircraft.

6. The system of claim 1, wherein the LZ comprises a helipad.

7. A method for adjusting sink rate alerts in a ground proximity warning system with a sink rate alert envelope for an aircraft, the method comprising:
   receiving an aircraft altitude value and an aircraft position value for the aircraft;
   receiving landing zone (LZ) information for a landing zone;
   determining an elevated landing scenario based on the received aircraft position value and LZ information, the elevated landing scenario indicating that the aircraft is on an approach to land at a landing zone which is raised above surrounding terrain;
   adjusting an upper boundary of the sink rate alert envelope by an amount proportional the LZ height information to define a modified sink rate alert envelope for the elevated landing scenario;
   receiving sink rate information including an aircraft sink rate for the aircraft;
   generating a sink rate alert during the elevated landing scenario when the aircraft sink rate is outside the modified sink rate alert envelope; and
   outputting the sink rate alert to an output device.

8. The method of claim 7, wherein the LZ information comprises an altitude value.

9. The method of claim 7, wherein outputting comprises outputting at least one of an audible or visual message.

10. The method of claim 7, wherein the aircraft is a rotary wing aircraft.

11. The method of claim 7, wherein the LZ comprises a helipad.

* * * * *